United States Patent [19]

Evans et al.

[11] 3,932,195

[45] Jan. 13, 1976

[54] ELECTRIC CELLS

[75] Inventors: Leslie Samuel Evans, Reading; John Richard Harbar, Wantage, both of England

[73] Assignee: Secretary of State for Industry in Her Britannic Majesty's Government of the United Kingdom of Great Britain and Northern Ireland, London, England

[22] Filed: Apr. 29, 1975

[21] Appl. No.: 572,827

[30] Foreign Application Priority Data
May 1, 1974 United Kingdom............... 19189/74

[52] U.S. Cl............... 136/6 FS; 136/20; 136/100 R
[51] Int. Cl.²................. H01M 35/04; H01M 43/00
[58] Field of Search........... 136/6 FS, 6 F, 6 LF, 20, 136/83 R, 100 R

[56] References Cited
UNITED STATES PATENTS

| | | | |
|---|---|---|---|
| 3,449,165 | 6/1969 | Stott | 136/6 FS |
| 3,756,856 | 9/1973 | Tennenhouse | 136/6 FS |
| 3,883,367 | 5/1975 | Chiku et al. | 136/6 F |

*Primary Examiner*—Anthony Skapars
*Attorney, Agent, or Firm*—Larson, Taylor and Hinds

[57] ABSTRACT

In a sodium-sulphur battery cell, an extended surface area current collector is sandwiched between portions of solid electrolyte, also of extended surface area, which provide between them a space for the liquid sulphur. The spacing between the current collector and each of the portions does not exceed the maximum distance that the sodium ions can diffuse in the liquid sulphur during a specified recharge time. A plurality of portions defining a plurality of spaces for the liquid sulphur may be provided, each space having an extended surface area current collector sandwiched between the portions defining the space.

A plurality of these battery cells may be arranged so that they are separated one from another by a bipolar electrode to provide a series connection.

22 Claims, 13 Drawing Figures

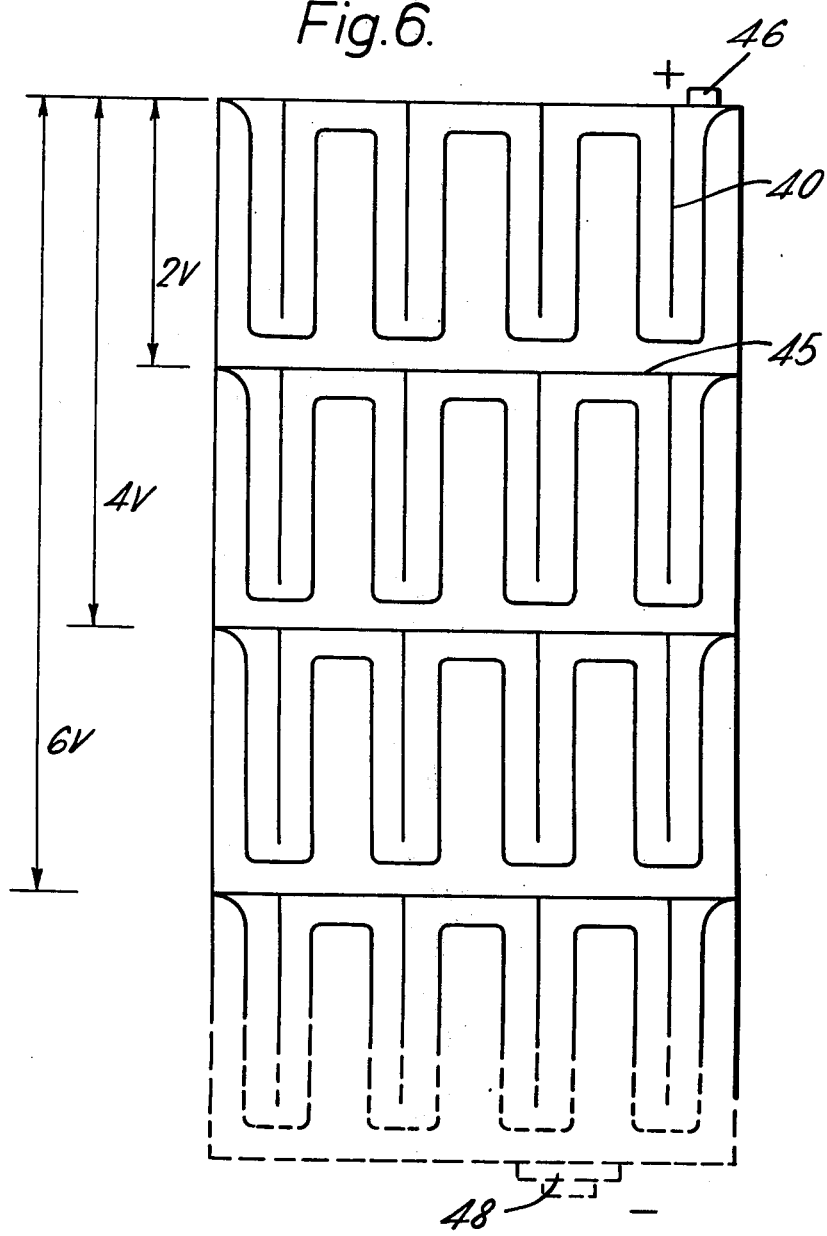

ELECTRIC CELLS

BACKGROUND TO THE INVENTION

This invention relates to electric cells, either primary or secondary, employing a liquid anode, a liquid cathode, a solid electrolyte which is conductive to the liquid anode ions, and current collecting means, but is more particularly concerned with secondary cells. One such cell using sodium as the liquid anode, sulphur as the liquid cathode, beta-alumina as the solid electrolyte, and graphite as the current collecting means is described in our co-pending U.S. Pat. application No. 10835/74. As used herein, the term liquid includes substances that are normally solid at ambient temperatures but which are substantially molten at the operating temperature of the electric cell.

SUMMARY OF THE INVENTION

According to the present invention, an electric cell for use with a liquid anode, and a liquid cathode, comprises an extended surface area current collecting means sandwiched between two solid electrolyte portions each having operating surface areas of substantial size, the two portions providing a space between them to contain liquid cathode and the current collecting means, and liquid anode being arranged to be disposed outside the said space on the other sides of the two portions.

Preferably, the current collecting means has an extended surface area at least equal to a major proportion of the area of the said operating surfaces of the portions defining the said space.

The invention also comprises an electric battery having at least two cells as specified in the preceding paragraphs so arranged that the cells are separated, one from another, at least in part, by a bipolar electrode means which provides a series connection between the cells.

Desirably, the current collecting means has a configuration which generally follows a median path between the portions of the solid electrolyte, and preferably, the portions are disposed so that the spacing between the median path and the said portions does not exceed the maximum distance that the liquid anode ions can diffuse through the liquid cathode during a specified recharge time.

The term extended surface area when used in relation to the current collecting means includes the area of any perforations, apertures, or the like, which allow the circulation therethrough of the liquid cathode. Naturally, the area of such perforations should not be such as to seriously impair the electrical efficiency of the current collector.

BRIEF DESCRIPTION OF THE DRAWINGS

Several forms of electric cells in accordance with the invention will now be described by way of example only and with reference to the accompanying drawings, in which:

FIG. 6 is a diagrammatic sectional view of a bank of cells as shown in FIG. 4 but having a bipolar electrode between adjoining cells.

Like or similar parts in all the cell forms have been given the same reference numerals for simplicity.

DETAILED DESCRIPTION OF THE EMBODIMENTS

Figure 1:
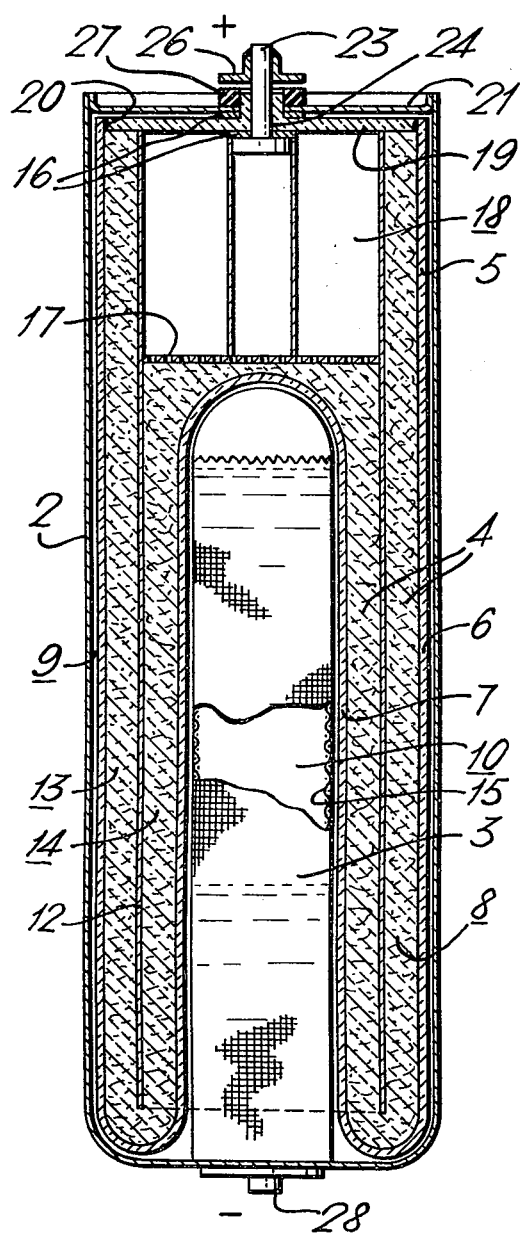
FIG. 1 is an axial sectional view of a cell having a circular annular solid electrolyte configuration.

Referring now to FIG. 1, the electric cell shown is of circular form in plan and comprises a low alloy steel casing 2, having within it liquid sodium 3 as the anode, liquid sulphur impregnated in a graphite felt 4 as the cathode, and a solid electrolyte 5 of beta-alumina having hollow cylindrical portions 6 and 7 disposed in contraposition so as to provide between them an annular space 8 for the liquid sulphur and graphite felt 4. Spaces for the liquid sodium 3 lie both internally and externally of the said space 8 being an outer annular space 9 between the casing 2 and portion 6 and an inner cylindrical space 10. A current collector 12 of graphite is provided, and has a lower hollow cylindrical part sandwiched between the portions 6 and 7 in the space 8 for the liquid sulphur so as to divide the said space 8 into two sub-spaces 13 and 14.

In further detail, the radial dimension of the annular space 9 is such as to constrain, by capillary action, the liquid sodium 3 within it to "wet" the outside surface of the portion 6 as the level of the liquid sodium falls in operation of the cell. A wick structure 15 of low alloy steel mesh constrains the liquid sodium 3 in the cylindrical space 10 to "wet" the adjacent surface of the portion 7 in a similar manner. Alternatively, a wick structure can be introduced in the annular space 9 to constrain the liquid sodium 3 to "wet" the outside surface of the portion 6 if a large annular space 9 is needed to act as a reservoir for liquid sodium 3. The graphite felt 4 also acts as a wick to constrain the liquid sulphur to "wet" the surface of the portion 6.

The upper part of the current collector 12 has a perforated radially disposed section 17 to maintain the graphite felt 4 in position, and to provide for expansion into a space 18 communicating with the liquid sulphur space 8 when polysulphides are produced by the combination of the sodium and sulphur ions. The current collector 12 may generally but not exclusively be of perforated form, or of a suitable mesh construction, to allow for the equalisation of any pressures generated in the sub-spaces 13 and 14 by the volume changes due to the formation of the polysulphides whilst retaining the graphite felt 4 in position.

The liquid sulphur is retained in the solid electrolyte 5 by an alpha-alumina disc 19 joined to the portion 6 by a glass frit seal 20 fitted between the outside edge of the disc 19 and the inside surface of the portion 6. The solid electrolyte 5 and the liquid sodium 3 are enclosed within the casing 2 by a low alloy steel end cap 21 welded to the side wall at the open end of the casing 2. The positive terminal is provided by a flanged rod 23 which extends through a hole 24 in the alpha-alumina disc 19 to connect with the current collector 12, and is retained by a compression collar 26 using an insulating collar 27 and sealing gaskets 16. (The collar 26 and insulating collar 27 are shown spaced apart for clarity.) The negative terminal 28 is attached at the closed end of the casing 2.

For maximum volume utilisation of the liquid cathode and to enable fast recharge times to be achieved, the radial dimension of each of the sub-spaces 13 and 14 should not exceed the maximum distance that the liquid anode ions can diffuse through the liquid cathode during a specified recharge time, since the rate of the said diffusion decreases with increasing distance.

Figure 1A:
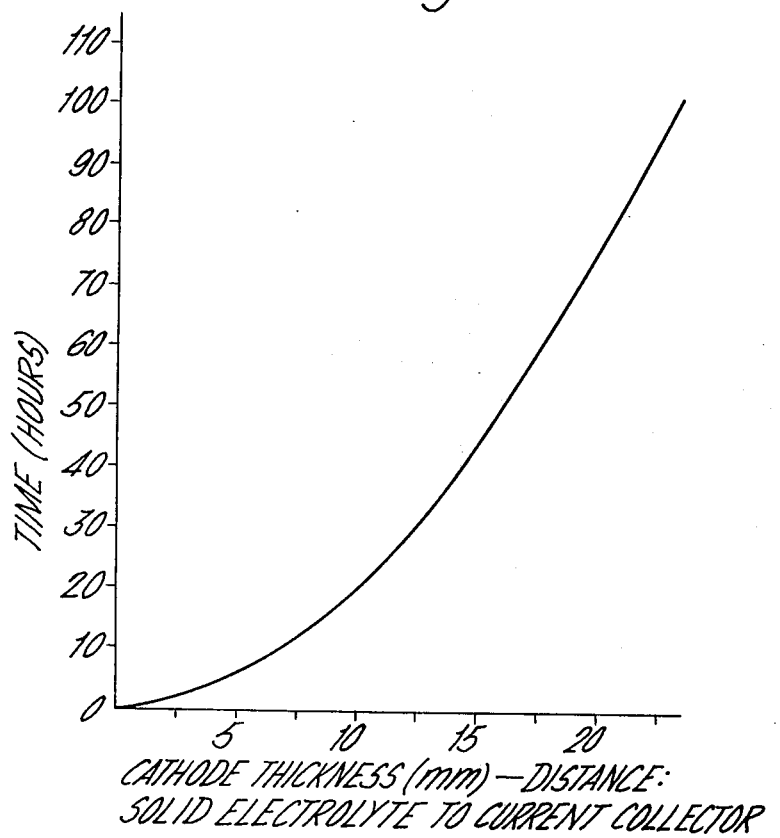
FIG. 1a represents a graph of the distance between the current collecting means and the solid electrolyte plotted against recharge time.

Theoretically, the time taken for the liquid sodium ions to diffuse through the liquid sulphur during the charging of the electric cell is not directly proportional to cathode thickness (distance between the current collector and the solid electrolyte) but increases as a function of the square of the cathode distance as can be seen from FIG. 1a, to which reference is now made, which represents the theoretical plot of cathode thickness in mm against recharge time in hours based on diffusion calculations. The invention therefore enables the cathode thickness to be kept to a minimum whilst providing an extended surface of solid electrolyte to maximise the current density. In practice, depending on the cell configuration other factors such as the effects of cathode convection, and wicking provided by the graphite felt 4, may for example reduce the theoretical recharge time. Cathode thicknesses of up to 10 mm have been found satisfactory to provide convenient recharge time, for example in one application a radial cathode thickness of 6 mm provided a convenient recharge time. Furthermore, the extended surface area of that part of the current collector 12 sandwiched between the portions 6 and 7 in the space 8 should be such that it is at least equal to a major proportion of the area of each of the surfaces of the portions 6 and 7 that it faces, and preferably, matches the area of these surfaces for the most efficient operation of the cell.

In operation, when the electric cell discharges through an external circuit (not shown) the liquid sodium 3 in contact with the solid electrolyte 5 is ionised with the release of electrons and forms the corresponding positive sodium ions. The electrons leave the cell through the negative terminal 28 to the external circuit, whilst the sodium ions are conducted through the solid electrolyte 5 to the liquid sulphur. The electrons from the external circuit are eventually conducted by the current collector 12, and through the graphite felt 4, to the liquid sulphur forming negative sulphur ions which combine with the sodium ions to form polysulphides. To recharge the electric cell, a current is provided to feed electrons through the negative terminal 28 to the liquid sodium, the other lead of the charging circuit being connected to the rod 23 to effect a reversal of the potential difference across the cell. The polysulphides dissociate and the sodium ions released flow through the solid electrolyte 5 to the spaces 9 and 10 containing liquid sodium.

Figure 1B:
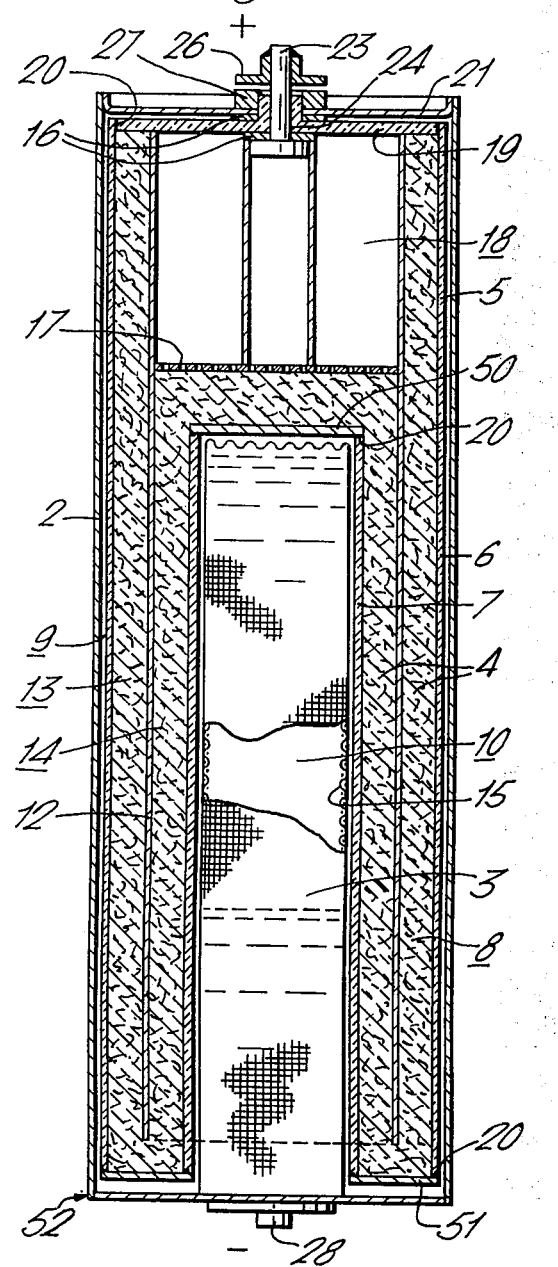
FIG. 1b shows a sectional view of a cell similar to that shown in FIG. 1 but having an alternative solid electrolyte configuration.

The solid electrolyte 5 shown in FIG. 1 is of one-piece construction, but to simplify the fabrication of the solid electrolyte 5, it may be made initially in separate pieces and assembled together using glass frit seals 20 as shown in FIG. 1b.

Referring to FIG. 1b, the solid electrolyte 5 has initially been made as hollow cylindrical pieces 6 and 7, and joined together by glass frit seals 20 in the desired configuration using a flat circular piece 50 and a flat annular piece 51 of beta-alumina to close the end of the inner cylindrical space 10 and annular space 8, and to provide the required radial spacing between the hollow cylinders 6 and 7. The closed end of the cell casing 2 has been provided with square corners 52 to accommodate the square corners of the solid electrolyte. If the loss of surface area of solid electrolyte can be tolerated, pieces 50 and 51 may be made from a non-conducting ceramic, for example from alpha-alumina.

Figure 2:
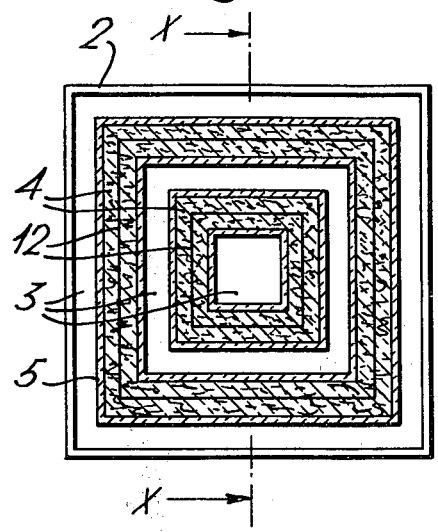
FIG. 2 is a plan sectional view of a cell having a plurality of non-circular annular electrolyte configuration.
Figure 2A:
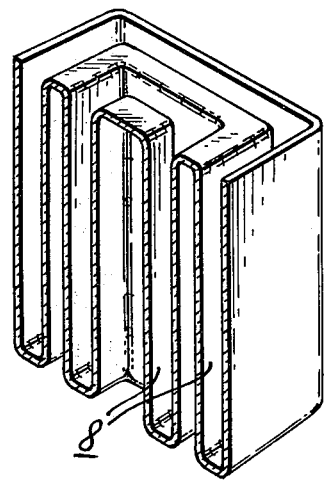
FIG. 2a is an isometric sectional view of the solid electrolyte configuration of FIG. 2 about the line X—X.
Figure 3:
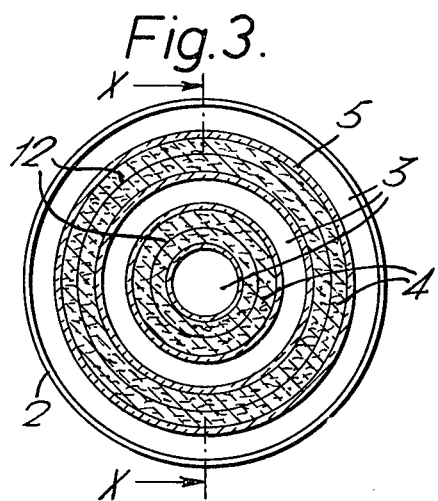
FIG. 3 is a plan sectional view of a cell having a plurality of circular annular solid electrolyte configurations.
Figure 3A:
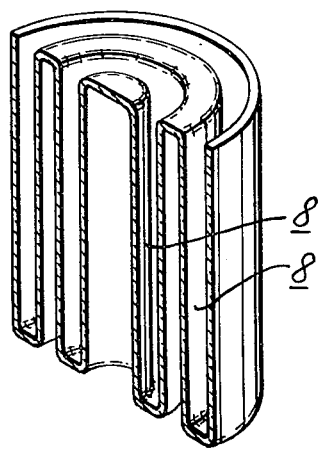
FIG. 3a is an isometric sectional view of the solid electrolyte configuration of FIG. 3 about the line X—X.
Figure 3B:
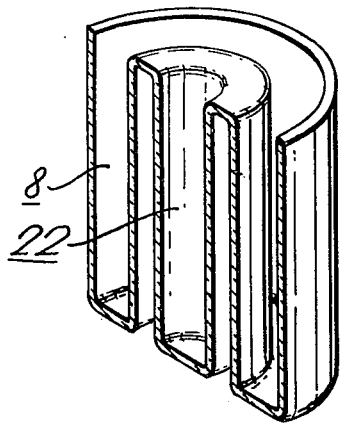
FIG. 3b is an isometric sectional view of an alternative electrolyte configuration for use in the cell shown in FIG. 3.

Referring now to the alternative electric cell constructions shown in FIGS. 2 and 3, these cells have a plurality of solid electrolyte configurations of annular form, both circular and non-circular, the configurations of the solid electrolyte 5 being shown in FIGS. 2a, 3a. In each case hollow current collectors 12 of graphite have one end disposed in the annular spaces 8 containing the liquid sulphur, and their other ends joined in parallel to a common connector (not shown). FIG. 3b shows an alternative solid electrolyte configuration to that described in FIG. 3a, having a central tubular space 22 and an outer annular space 8 for the liquid sulphur and graphite felt 4. In a cell construction using the solid electrolyte configuration described in FIG. 3b, a rod-like current collector (not shown) of graphite would have one end disposed along the length of the tubular space 22 and the other end joined to a common connector (not shown) to which the current collector 12 disposed in the space 8 would also be joined.

Figure 4:
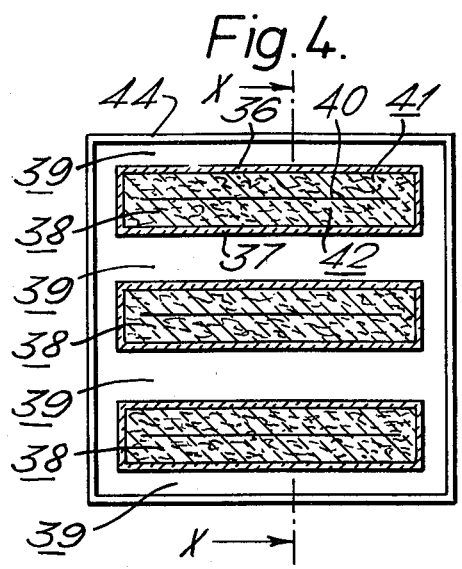
FIG. 4 is a plan sectional view of a cell having a solid electrolyte of corrugated configuration.
Figure 4A:
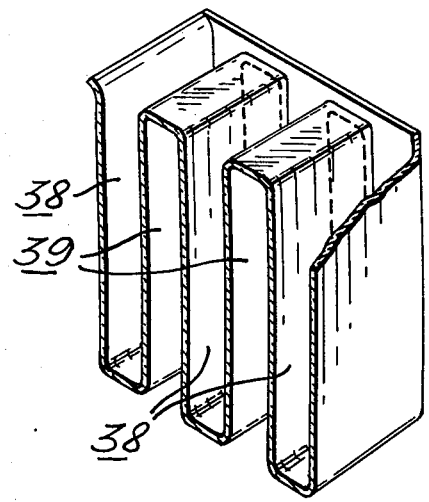
FIG. 4a is an isometric sectional view of the solid electrolyte in FIG. 4 about the line X—X.

An alternative electric cell is shown in FIG. 4, having a low alloy steel casing 44, and a solid electrolyte of corrugated configuration with substantially parallel portions 36 and 37 disposed in contraposition to provide a plurality of combinations of a space 38 between them for the liquid sulphur and graphite felt 4 and spaces 39 either side of the said space 38 for the liquid sodium 3. A flat current collector of graphite 40 has one end sandwiched between the portions 36 and 37 in each of the spaces 38 for the liquid sulphur to define sub-spaces 41 and 42, and the other end joined to a common connector (not shown). The configuration of the solid electrolyte is shown in FIG. 4a. Stiffening ribs (not shown) may be incorporated in this construction on the flat sides of the portions 36 and 37, and also in a similar manner in the non-circular annular configuration of FIG. 2.

Figure 2B:
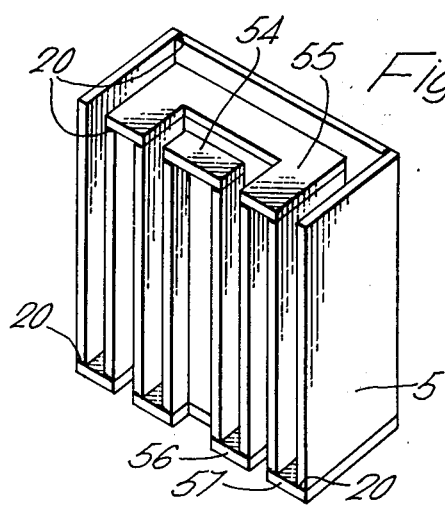
FIG. 2b is a solid electrolyte similar in configuration to that shown in FIG. 2a but having alternative end portions.

In each of the electric cells described in FIGS. 2, 3 and 4, the design principles essentially follow those disclosed in relation to the electric cell described in FIG. 1, and in a similar way the solid electrolyte may be fabricated in separate pieces and assembled together using glass frit seals 20, as shown for example in FIG. 2b.

Referring to FIG. 2b the walls of the solid electrolyte 5 are assembled together by glass frit seals 20, in the desired configuration, using flat end pieces 54, 55, 56 and 57 of beta-alumina. The hollow rectangular shape of the walls may be achieved by joining together, with glass frit seals 20, flat plates of beta-alumina. If the loss of surface area of solid electrolyte can be tolerated, end pieces 54, 55, 56 and 57 may be made from a non-conducting ceramic, for example, from alpha-alumina.

Figure 5:
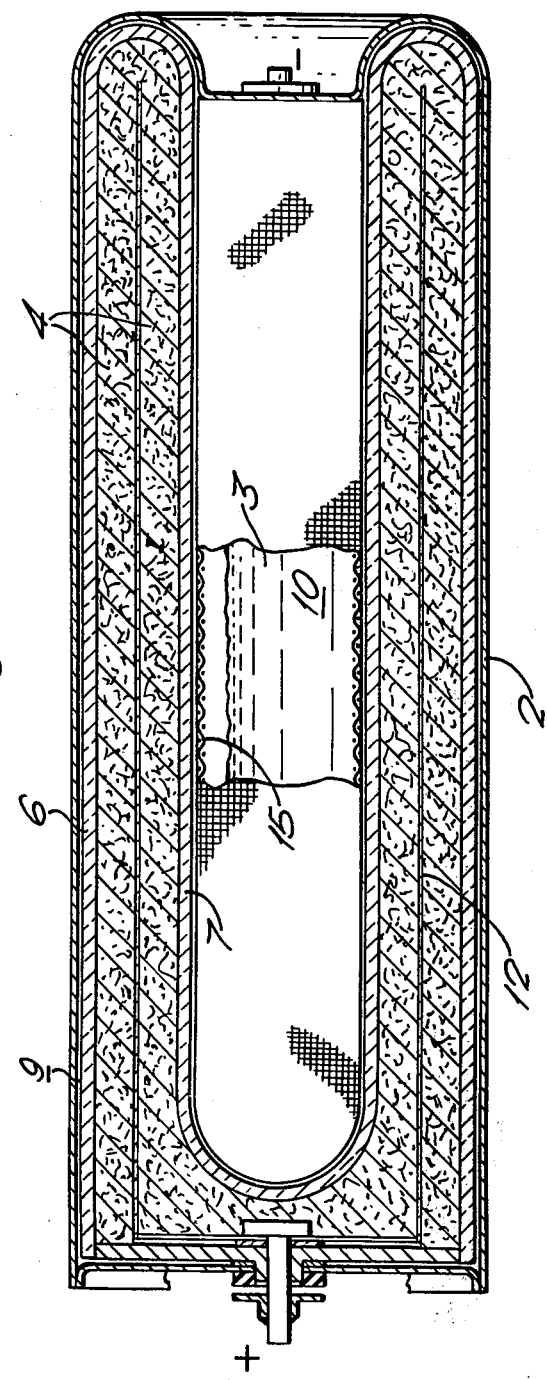
FIG. 5 is an axial sectional view of a cell similar to the cell shown in FIG. 1, but having an alternative arrangement for providing an expansion space for the liquid cathode.

Referring to the alternative cell shown in FIG. 5, this is particularly advantageous for use with its longitudinal axis in a horizontal mode, for applications where there is a height limitation. It essentially conforms to the design principles of the cell shown in FIG. 1, but has a different arrangement for accommodating the expansion within the liquid sulphur caused by the formation of polysulphides during discharge of the cell. In the cell shown in FIG. 5, the graphite felt 4 is only partially impregnated with sulphur to leave a suitable distributed voidage therewithin to accommodate the said expansion. The graphite felt 4, apart from acting as an electrical conductor, also performs the function of a wick which constrains, by capillary action, the liquid sulphur to "wet" the surfaces of the portions 6 and 7 of the solid electrolyte 5. As in the cell of FIG. 1, the liquid sodium 3 is also constrained to "wet" the surfaces of the portions 6 and 7 of the solid electrolyte 5. The cell described in FIG. 5 has a lower energy storage capacity than a cell of the kind shown in FIG. 1 having an equivalent space for the liquid cathode and graphite felt 4, because of the reduction in the amount of liquid cathode provided. The solid electrolyte 5 may be fabricated in separate pieces and assembled as shown for example in FIG. 1b. Although the cell configurations as shown in FIG. 1 and FIG. 5 are of circular form in section transverse to their longitudinal axis, non-circular configurations may be used, such as rectangular, or the square shape as shown for example in FIG. 2.

Alternative liquid anode and liquid cathode materials may be used with appropriate solid electrolytes. Alternative current collecting materials may be used, for example, composite current collectors such as a metal (e.g. aluminium) inner structure sheathed with graphite or carbon. As an alternative to the flat sheet current collectors, or the like, described in the foregoing paragraphs, a grid structure made from a plurality of rod-like elements of, for example graphite, or a moulded graphite structure having a plurality of apertures may be used. The current collector may be shaped to provide protuberances, for example, webs or spikes, projecting into the space for the liquid cathode, to assist in injecting electrons into the liquid cathode. Alternative materials for the casings 2 and 44, and the wick 15 such as stainless steel or aluminium, may also be used depending on the liquid anode material used and the operating temperature of the cell.

The electric cells described in FIGS. 1 to 5, result in high volume utilisation of the liquid cathode with consequent relatively high energy storage capacity and fast recharge rates.

Referring now to FIG. 6 in which a further form of the invention is shown, a bank of electric cells as shown in FIG. 4, are joined together so that a base 45 of one cell also forms a common connector of the current collector 40, of an adjacent cell. The base 45 thereby acts as a bipolar electrode between the adjacent cells to provide a series connection. A plurality of such cells joined in this manner provide a voltage output equal to the sum of the individual voltage outputs of each cell. In such an arrangement, the positive terminal 46 is connected to the common connector of the current collector 40 at one end of the arrangement, and the negative terminal 48 is connected to the base 45 at the other end of the arrangement. The bank of cells shown in FIG. 6 indicate the cumulative voltage effect of joining a plurality of such cells together. Although the use of a bipolar electrode has been described in relation to the electric cell shown in FIG. 4, a bank of cells connected in a similar way with a bipolar electrode may be constructed using the cell arrangements shown in FIGS. 1, 2, 3 and 5. The bipolar electrode may be made from a corrosion resistant metal such as molybdenum.

The arrangement described in relation to FIG. 5 of providing an expansion space within the graphite felt 4 for the polysulphides formed during discharge of the cell, may also be used in relation to any of the electric cells shown in FIGS. 1, 2, 3 and 4, as an alternative to, and to implement, the arrangement shown in FIG. 1 of providing an expansion space 18. Reference is directed to our co-pending patent application No. 24391/73. A reservoir for liquid sodium may also be provided by a chamber within the casing 2, or the casing 44. It will be appreciated from FIG. 1 that the graphite felt need not completely fill the space for the liquid sulphur, and by this means an expansion space may be provided for the liquid sulphur and polysulphides.

We claim:

1. An electric cell for use with a liquid anode, and a liquid cathode, comprising a solid electrolyte having at least two portions disposed in contraposition so as to provide between them on one side a space for the liquid cathode, the liquid anode being arranged to lie outside the said space on the other sides of each of the said portions, and current collecting means of extended surface area disposed in the said space and substantially dividing the space into two sub-spaces, each sub-space being bounded on one side by a surface of one side of one of the portions of the solid electrolyte and on the other side by a part of the current collecting means having an extended surface area at least equal to a major proportion of the area of the said surface.

2. An electric cell as claimed in claim 1, wherein capillary means are provided adjacent to the said other side of each of the solid electrolyte portions to constrain the liquid sodium to flow over the solid electrolyte portions.

3. An electric cell as claimed in claim 1, wherein the current collecting means is shaped to provide an expansion space communicating with the space for the liquid cathode.

4. An electric cell as claimed in claim 1, wherein the current collecting means is of perforated form.

5. An electric cell as claimed in claim 1, wherein the current collector is shaped to provide portions projecting into the sub-spaces.

6. An electric cell as claimed in claim 1, wherein graphite felt is disposed in the space and is partially filled with the liquid cathode, the voidage in the felt providing an expansion space, and the felt acting as a capillary means to constrain the liquid cathode to flow over the surface of the solid electrolyte portions.

7. An electric cell as claimed in claim 1, wherein stiffening ribs are incorporated in the solid electrolyte portions.

8. An electric cell as claimed in claim 1, wherein the solid electrolyte portions provide a plurality of said spaces for the liquid cathode, the liquid anode being arranged to lie outside each of the said spaces.

9. An electric battery having a plurality of cells as claimed in claim 1, the cells being arranged so that adjacent cells are separated one from another by a bipolar electrode means which provides a series connection between the cells.

10. An electric cell as claimed in claim 1, wherein the current collecting means has a configuration which generally follows a median path between the portions of the solid electrolyte.

11. An electric cell as claimed in claim 10, wherein the spacing between the median path and said portions does not exceed the maximum distance that the liquid anode ions can diffuse through the liquid cathode in a specified recharge time for which the cell has been designed.

12. An electric cell as claimed in claim 11, for use with sodium as the liquid anode and sulphur as the liquid cathode, wherein the spacing is of the order of 6 mm.

13. An electric cell for use with sodium as the liquid anode and sulphur impregnated in a graphite felt as the liquid cathode, comprising a solid electrolyte having at least two portions arranged to be of outer and inner tubular form and disposed one within the other with one of their ends on the same transverse plane to provide between them on one side a space for the liquid sulphur and graphite felt, a metal casing into which the portions are disposed, the sodium being arranged to lie outside the said space on the other side of the said portions between the portions and the casing, a closure means at the said one end of the portions closing the space, and another closure means at the other end of the inner portion closing the bore of the tubular inner portion, a current collecting means of tubular form and extended surface area disposed within the space so as to substantially follow a median path in the said space and substantially divide the space into two sub-spaces, the spacing between the current collecting means and the solid electrolyte portions not exceeding the maximum distance that the sodium ions can diffuse through the liquid sulphur during a specified recharge time for which the cell has been designed.

14. An electric cell as claimed in claim 13, wherein the tubular portions and the current collecting means are of hollow cylindrical form.

15. An electric cell as claimed in claim 13, wherein the closure means and the another closure means are fabricated as an integral part of the solid electrolyte.

16. An electric cell as claimed in claim 13, wherein the current collecting means is of perforated form.

17. An electric cell as claimed in claim 13, wherein the current collecting means is shaped to provide protuberances projecting into the sub-spaces.

18. An electrode cell as claimed in claim 13, wherein capillary means are provided adjacent to the solid electrolyte portions to constrain the liquid sodium to flow over the solid electrolyte.

19. An electric cell as claimed in claim 13, wherein the current collecting means is shaped to provide an expansion space for polysulphides.

20. An electric cell as claimed in claim 13, wherein the graphite felt is only partially impregnated with sulphur to leave a voidage in the graphite felt, the voidage providing an expansion space for polysulphides, and the felt acting as a capillary means to constrain the liquid sulphur to flow over the solid electrolyte portions.

21. An electric cell as claimed in claim 13, wherein the solid electrolyte portions provide a plurality of said spaces for the liquid cathode, the liquid anode being arranged to lie outside each of the said spaces.

22. An electric battery having a plurality of cells as claimed in claim 13, the cells being arranged so that adjacent cells are separated one from another by a bipolar electrode means which provides a series connection between the cells.

* * * * *